United States Patent [19]

Hughart

[11] 3,884,491

[45] May 20, 1975

[54] ADJUSTABLE COLLAPSIBLE CART

[76] Inventor: Frederick L. Hughart, 4453 Coronado, San Diego, Calif. 92107

[22] Filed: Feb. 6, 1974

[21] Appl. No.: 440,173

[52] U.S. Cl. ............................ 280/35; 280/47.13 R
[51] Int. Cl. ............................................ B62d 21/18
[58] Field of Search .......... 280/35, 79.1, 34 B, 79.2, 280/47.13 R

[56] References Cited
UNITED STATES PATENTS

| | | | |
|---|---|---|---|
| 1,715,865 | 6/1929 | Rosenfeld | 280/35 |
| 1,743,904 | 1/1930 | Russel | 280/35 |
| 2,439,851 | 4/1948 | Higgins | 280/34 B |
| 3,735,996 | 5/1973 | Rath | 280/35 |

*Primary Examiner*—Robert R. Song
*Attorney, Agent, or Firm*—Brown & Martin

[57] ABSTRACT

A simple light weight cart for carrying luggage, packages, or the like. The cart is an open box type structure divided longitudinally and adjustable in width by means of slidable couplings, with provision for securing straps to hold the contents in place. Wheel units are longitudinally adjustable for balancing a load, and are quickly detachable for storage in one end of the cart, the stored wheel units being retained by adjustable support legs which can be extended to support the cart in a level position. Telescopic handles are provided for ease of handling.

9 Claims, 5 Drawing Figures

PATENTED MAY 20 1975   3,884,491
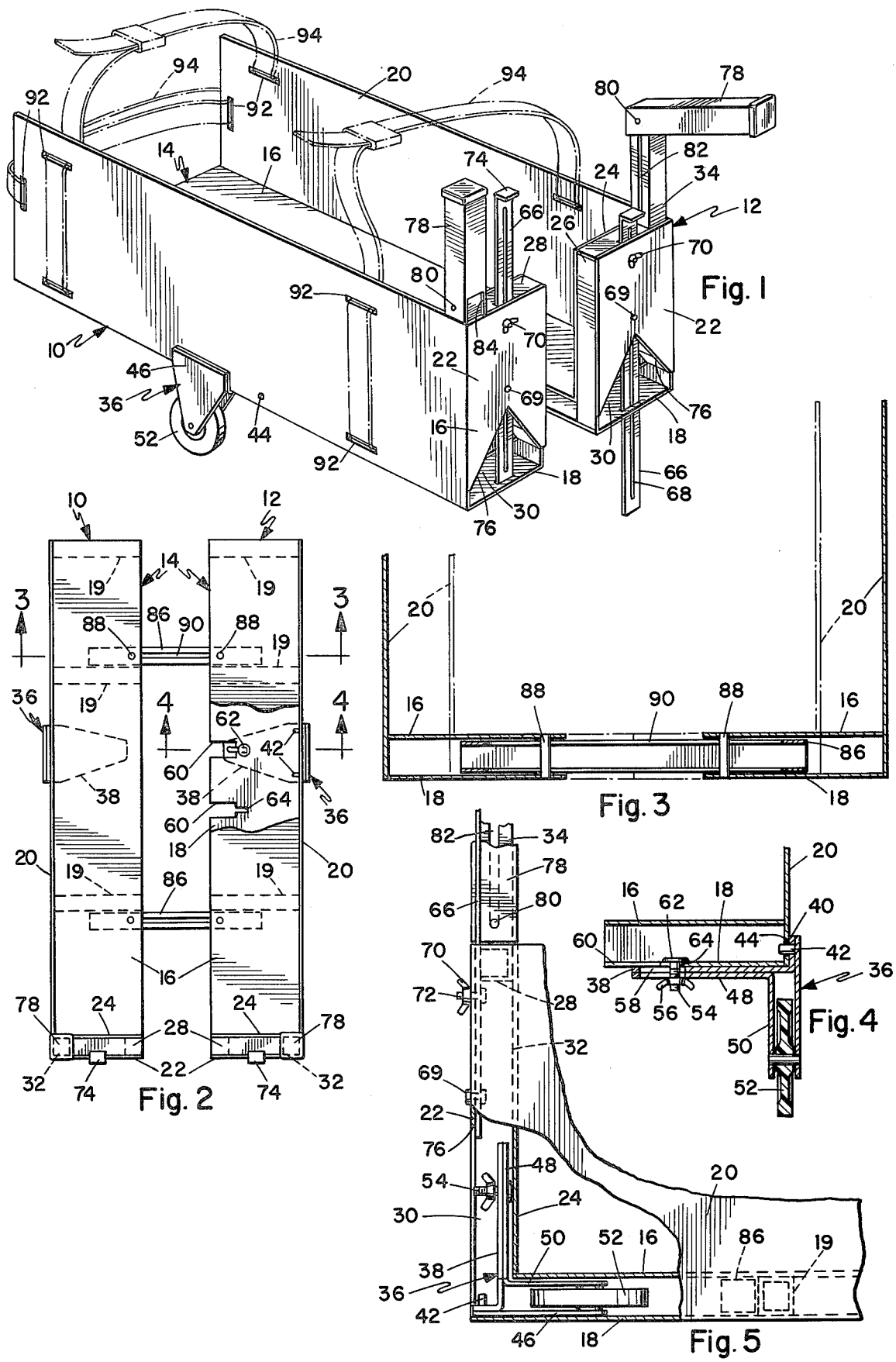

ADJUSTABLE COLLAPSIBLE CART

BACKGROUND OF THE INVENTION

Small hand carts, such as shopping carts, are often of wire construction and, if of foldable type, are not particularly rigid when set up for use. Fixed structure types are very bulky and are not easily stored or carried, the shopping cart configuration not being suitable for carrying large items of luggage. Wagon or dolly types suitable for luggage are normally heavy and bulky, with no means for adjustment or folding for storage.

SUMMARY OF THE INVENTION

The cart described herein is light in weight, easily carried and stored and is adjustable to carry a variety of loads. The structure is basically a box of sheet metal, open at the top and one end, the box being divided longitudinally with the sections connected by slidable couplings to allow adjustment of width. Wheels are detachably secured to the cart and are longitudinally adjustable for load balance. For storage the wheels fit into compartments in the closed end of the box structure. Support legs are mounted on the closed end and can be extended to hold the cart level on its wheels, the legs also serving to retain the stored wheels in their compartments. Telescopic handles are attached to the closed end and the cart has provision for multiple retaining straps to hold the load in place.

The primary object of this invention, therefore, is to provide a new and improved adjustable collapsible cart.

Another object of this invention is to provide a new and improved cart of light weight but rigid structure, which is adjustable in width.

Another object of this invention is to provide a new and improved cart having adjustable and storable wheels.

A further object of this invention is to provide a new and improved cart having adjustable support legs.

Other objects and many advantages of this invention will become more apparent upon a reading of the following detailed description and an examination of the drawings, wherein like reference numerals designate like parts throughout and in which:

FIG. 1 is a perspective view of the cart.

FIG. 2 is a top plan view of the cart, with a portion cut away.

FIG. 3 is an enlarged sectional view taken on line 3—3 of FIG. 2.

FIG. 4 is an enlarged sectional view taken on line 4—4 of FIG. 2.

FIG. 5 is an enlarged side view of the forward portion of the cart, cut away to illustrate the wheel storage.

DESCRIPTION OF THE PREFERRED EMBODIMENT

The cart is basically a rectangular sheet metal box structure composed of left and right hand frames 10 and 12 which, for convenience, are of similar but opposite construction. Frame 10 will be described in detail, the various components being correspondingly numbered in frame 12.

Frame 10 has a double walled floor 14 comprising an upper floor panel 16 and a lower floor panel 18, which are joined by spacers 19, illustrated as tubular members of square cross section. The structure may be rivetted, welded, or otherwise rigidly assembled. Fixed to the outside longitudinal edge of floor 14 is a vertical side wall 20, and at the forward end is a vertical front wall 22. The front wall is a double walled structure, with an inner front wall 24 spaced from the wall 22 by an upright inner post 26 and a top spacer 28. The lower edge of inner wall 24 abuts the front edge of upper floor panel 16, to form a L-shaped cavity 30 in the forward double walled structure. At the outside junction of the front walls with side wall 20 is an outer post 32, with an upward extension 34 above the walls. The inner longitudinal edge of the double floor is left open, and the top and rear of the box structure are open.

Mounted on frame 10 is a wheel unit 36, having a mounting plate 38 which seats under floor 14 and an upwardly turned flange 40 which fits against the lower edge portion of side wall 20. Flange 40 has retaining pins 42 which fit into spaced holes 44 in the side wall, additional holes being provided for longitudinal adjustment of the wheel unit. Fixed to flange 40 is a downwardly extending outer leg 46, and fixed to mounting plate 38 is a doubler 48 with a downwardly extending inner leg 50. A wheel 52 is freely rotatably mounted between legs 46 and 50. The wheel unit 36 is held in place by a bolt 54 and wing nut 56, and the bolt being fitted through an elongated slot 58 is mounting plate 38 and doubler 48. The inner edge of lower floor panel 18 has slots 60 spaced to correspond with pin receiving holes 44, each slot being large enough to clear the head 62 of bolt 54. At the outer end of each slot 60 is a reduced width socket 66 to receive the bolt 54, which is clamped in place by wing nut 58 as in FIGS. 2 and 4. To release the wheel unit, the wing nut is loosened and the bolt is slid along slot 58 until head 62 is over slot 60. The wheel unit can then be tilted slightly and pins 42 pulled clear of holes 44.

Mounted on the inside of front wall 22 substantially at the center is a support leg 66 which is vertically adjustable. The leg has a longitudinal slot 68 and rides on a pin 69 near the lower end, the leg being held by wing nut 70 on a bolt 72 secured to the front wall 22. At the upper end of the leg is a forwardly turned flange 74 to facilitate handling. The support leg is normally stored in the retracted position illustrated on frame 10 in FIG. 1. To hold the cart level, or in any other desired position, the leg is extended downwardly as on frame 12 in FIG. 1.

The front panel 22 has an opening in the lower portion, the opening 76 being of a size and configuration to admit wheel unit 36. The wheel unit is inserted with the legs and wheel fitting into the portion of cavity 30 in the hollow floor, the mounting plate and doubler extending vertically in the hollow front wall, as in FIG. 3. Leg 66 is raised clear of opening 76, as also illustrated in FIG. 3, to allow insertion and removal of the wheel unit, and is lowered to normal retracted position to obstruct the opening and hold the stored wheel unit in place.

Mounted on post extension 34 is a handle 78, which is a vertical sliding fit and is retained by a pin 80 passing through a vertical slot 82 in the extension. The forward lower portion of handle 78 has a cut-out 84 to allow the handle to swing forward at the upper end of the extension, as on the frame 12 in FIG. 1, for convenient handling.

The two frames 10 and 12 are joined by connecting bars 86 sliding in the hollow floor structure. Some of the spacers 19 are positioned to serve as parallel sliding guides for the connecting bars. The frames are secured by pins 88 fixed between floor panels 16 and 18 and passing through longitudinal slots 90 in the connecting bars, as in FIG. 3. In the closed position indicated in broken line, the inner edges of the frames are abutting. The frames can be separated as necessary to the limits of the connecting bars, to suit a particular load in the cart.

Side walls 20 are provided with openings 92 at convenient positions for attachment of straps 94 to hold a load in place. By passing the straps between the frames through the hollow floors, they also serve to hold the frames together on opposite sides of the load.

For storage the cart is collapsed to minimum width, the wheel units are removed and stored in the frames, and the support legs and handles are retracted. In use the cart is adaptable to a variety of loads and can be held level for loading by the support legs. The wheel units can be positioned for the best load balance to facilitate handling.

Having described my invention, I now claim.

1. An adjustable collapsible cart, comprising:
an open topped box structure including a pair of opposite handed frames, each having a floor, a side wall and a front wall;
said frames having adjustable interconnecting means for varying the spacing between the side walls;
a wheel unit detachably secured to each frame;
each of said frames having a cavity for storage of the respective wheel unit;
handle means on at least one of said frames,
each of said floors is hollow with an upper panel and a lower panel;
and said interconnecting means including connecting bars slidably attached to said frames within the hollow floors.

2. An adjustable collapsible cart according to claim 1, and including an adjustable supporting leg slidably mounted on at least one front wall.

3. An adjustable collapsible cart according to claim 1, and including spacers in said hollow floors, said connecting bars being slidable against and guided by certain of said spacers.

4. An adjustable collapsible cart according to claim 1, wherein said wheel storage cavities are in the hollow floors.

5. An adjustable collapsible cart according to claim 1, wherein each of said front walls is hollow, with an opening in the front thereof to receive the wheel unit, the wheel receiving cavity being contained in the hollow floor and front wall structure.

6. An adjustable collapsible cart according to claim 5, and including a supporting leg adjustably slidably mounted on each front wall, the supporting leg covering a portion of said opening in one position to retain the wheel unit therein.

7. An adjustable collapsible cart according to claim 6, wherein each wheel unit has a mounting plate with means for releasable attachment in at least one position to the underside of the respective floor, legs extending from said mounting plate, and a wheel freely rotatably mounted between the legs.

8. An adjustable collapsible cart according to claim 5, wherein said handle means includes a post in the front wall projecting upwardly therefrom, and a handle member slidably and pivotally mounted on said post.

9. An adjustable collapsible cart according to claim 1, wherein said side walls, at least, have slots therein for receiving load retaining straps.

* * * * *